(12) United States Patent
Sang et al.

(10) Patent No.: US 10,045,360 B2
(45) Date of Patent: Aug. 7, 2018

(54) MACRO-ASSISTED MULTI-CONNECTIVITY SCHEME IN MULTI-RAT CELLULAR SYSTEMS

(71) Applicant: MEDIATEK INC., Hsinchu (TW)

(72) Inventors: Aimin Justin Sang, San Diego, CA (US); Yuanyuan Zhang, Beijing (CN)

(73) Assignee: MediaTek Inc., Hsinchu (TW)

( * ) Notice: Subject to any disclaimer, the term of this patent is extended or adjusted under 35 U.S.C. 154(b) by 130 days.

(21) Appl. No.: 15/099,708

(22) Filed: Apr. 15, 2016

(65) Prior Publication Data

US 2017/0303286 A1   Oct. 19, 2017

(51) Int. Cl.
*H04W 72/08* (2009.01)
*H04W 72/04* (2009.01)
*H04W 76/04* (2009.01)
*H04W 24/08* (2009.01)
*H04W 76/27* (2018.01)

(52) U.S. Cl.
CPC ......... *H04W 72/085* (2013.01); *H04W 24/08* (2013.01); *H04W 72/042* (2013.01); *H04W 72/0413* (2013.01); *H04W 76/046* (2013.01); *H04W 76/27* (2018.02)

(58) Field of Classification Search
CPC .... H04W 16/32; H04W 84/045; H04W 88/08
See application file for complete search history.

(56) References Cited

U.S. PATENT DOCUMENTS

| | | | | |
|---|---|---|---|---|
| 2005/0243848 | A1* | 11/2005 | Yuan | H04L 47/527 370/412 |
| 2011/0263214 | A1* | 10/2011 | Robinson | H04B 1/006 455/88 |
| 2015/0358957 | A1* | 12/2015 | Kim | H04W 16/32 455/450 |
| 2016/0057687 | A1* | 2/2016 | Horn | H04W 24/10 370/331 |

* cited by examiner

*Primary Examiner* — Jamal Javaid
(74) *Attorney, Agent, or Firm* — Imperium Patent Works; Zheng Jin (57) ABSTRACT

A novel Macro-assisted Multi-Connectivity (MC) mobility scheme for UEs traversing clusters of (mmWave) small cells (small-BS or SBS) under the coverage of the same 5G or LTE Macro-cell (macro-BS or MBS) is proposed. It keeps the same Control/User split scheme and C-Plane anchor at MBS, same as in LTE Dual Connectivity (DuCo or DC), yet extending DuCo with a multi-connectivity split bearer user plane. For example, MBS adopts a multi-way packet data convergence protocol (PDCP) bearer split based on routing weighted by channel quality, SBS's resource availability, etc. with or without inter-BS flow control. Utilizing the MC user plane, a macro-assisted make-before-break MC mobility can be enabled.

21 Claims, 7 Drawing Sheets

FIG. 10

MACRO-ASSISTED MULTI-CONNECTIVITY SCHEME IN MULTI-RAT CELLULAR SYSTEMS

TECHNICAL FIELD

The disclosed embodiments relate generally to wireless communications, and, more particularly, to macro-assisted multi-connectivity schemes in multi-RAT wireless systems.

BACKGROUND

A Long-Term Evolution (LTE) system offers high peak data rates, low latency, improved system capacity, and low operating cost resulting from simplified network architecture. LTE systems also provide seamless integration to older wireless network, such as GSM, CDMA and Universal Mobile Telecommunication System (UMTS). In LTE systems, an evolved universal terrestrial radio access network (E-UTRAN) includes a plurality of base stations, such as evolved Node-B's (eNBs) communicating with a plurality of mobile stations referred as user equipment (UEs). Dual Connectivity (DuCo or DC) UE is introduced to enhance mobility, bandwidth, and flexibility use of the network. A UE with dual connectivity has more than one transceivers corresponding to more than one MAC entities. The multiple MAC entities can be configured to communicate with multiple eNBs simultaneously.

The upcoming next generation "5G" Millimeter Wave (mmWave) small cell is expected to coexist with microwave (e.g., E-UTRAN) macro cells for a long time. The macro-assisted mmWave cellular systems exploit the fact that mmWave small cells and microwave macro cells may compensate each other very well in coverage area, link capacity, spectrum availability, and service robustness. From both network and radio access's perspectives, mmWave is currently considered a very promising choice for in-door or out-of-door "5G" cellular small cells, which may compensate microwave macro-cell in shortage of spectrum or in need for economical high-speed data services. In particular, the small cells offer downlink (DL) throughput boosting or coverage extension for an umbrella macro-cell at its edge. On the other hand, macro-cell coverage makes up mmWave's directional coverage limitation and bursty link disruption by offering reliable omni-directional overlay services for time-critical or mission-critical control signaling, or offering more robust and seamless services for low-rate high-mobility (voice) users. Together they constitute a layered or scalable communication infrastructure that promise reliability, wide coverage, economical yet diversified mobile QoS services.

The existing LTE HetNet Dual Connectivity (DuCo) architecture is not fine-tuned for mmWave small cells that have new radio characteristics and face new 5G requirements as well. The LTE DuCo architecture is designed only for some less densely deployed, relatively low-frequency microwave smallcell scenarios, and not optimized for stationary or dense scenarios with Gbps mmWave small cells. Furthermore, LTE DuCo mobility is used in omni-directional cellular systems of no beamformed control channel. While LTE DuCo may be used as the baseline for macro-assisted mmW mobility, it lacks some reliability due to beamforming. With UE's control channel anchored solely to master eNB (MeNB), DuCo allows 2-way PDCP bearer split between MeNB and secondary eNB (SeNB) for data plane to UE. UE sees service degradation at the edge due to signal weakness or frequent (beamformed) link disruption during S2S addition/release or otherwise rate mismatch during S2M fallback. Similar 2-way split DuCo concepts are applied to other Multi-RAT systems, e.g., LTE-WiFi (LWA) aggregation, with potentially the same limitation.

Compared to 4G system, 5G demands uniform UE service experience even at "cell edge", while 5G mmWave-specific CH and BF characteristics present new challenges to mobility reliability and seamlessness. First, directional beamforming makes mobility management even harder and more time critical due to complex, time-consuming beam alignment, beam switching, and beam tracking. Second, Multiple levels of beams, multiple beams per level, multiple (TDM) BF-ed control beams per cell to scan makes scanning more time and power consuming with frequent and intermittent link disruptions and blockage. Third, high handover (HO) ping-pong rate happens even at mild channel blocking while HO failure rate is very high at severe blockage. The service rate and reliability at cell edges of 5G multi-RAT systems, if still following the existing design of DuCo's data plane, may not meet the 5G requirements for uniform edge or center services. For this purpose and for the purpose of providing more robust mobility, a bandwidth aggregation at the cell edge of neighboring small cells and/or macrocell, and a make-before-break mobility scheme, may present a whole solution. Such a design is not yet supported by the DuCo architecture in either user plane or control plane. Therefore, an enhanced macrocell-assisted smallcell mobility with multi-connectivity, for example for a multi-RAT system including 5G enhanced LTE macro plus (mmWave) smallcell systems, or for a LTE-WiFi aggregation systems, is desired to meet both the 5G demands and the mmWave mobility challenges.

SUMMARY

A novel Macro-assisted Multi-Connectivity (MC) scheme for fixed user equipments (UEs) connecting to or mobile UEs traversing clusters of (mmWave) small cells (small-BS or SBS) under the coverage of the same 5G or LTE Macro-cell (macro-BS or MBS) is proposed. It keeps the same Control/User split scheme and C-Plane anchor at MBS, same as in LTE Dual Connectivity (DuCo or DC), yet extending DuCo with a multi-connectivity split bearer user plane. For example, MBS adopts a multi-way packet data convergence protocol (PDCP) bearer split based on routing weighted by channel quality, SBS's resource availability, etc. with or without inter-BS flow control. Utilizing the MC user plane, a macro-assisted make-before-break MC mobility can be enabled.

In one embodiment, a UE establishes a radio resource control (RRC) connection with a macro base station (MBS) in a heterogeneous network having a macrocell served by the MBS and overlaying smallcells service by smallcell base stations (SBSs). The UE establishes a multi-connectivity (MC) multi-way split bearer U-Plane for simultaneous data transmission with one or more base stations. The UE performs macro-assisted make-before-break MC mobility by using the multi-way split bearer.

In another embodiment, a macro base station (MBS) establishes a radio resource control (RRC) connection with a UE in a multi-RAT network having a microwave macrocell served by the MBS and overlaying smallcells served by smallcell base stations (SBSs). The MBS establishes a multi-connectivity (MC) multi-way split bearer U-Plane together with the SBSs for providing simultaneous data transmission to the UE. The MBS performs macro-assisted make-before-break MC mobility for the UE by using the multi-way split bearer.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
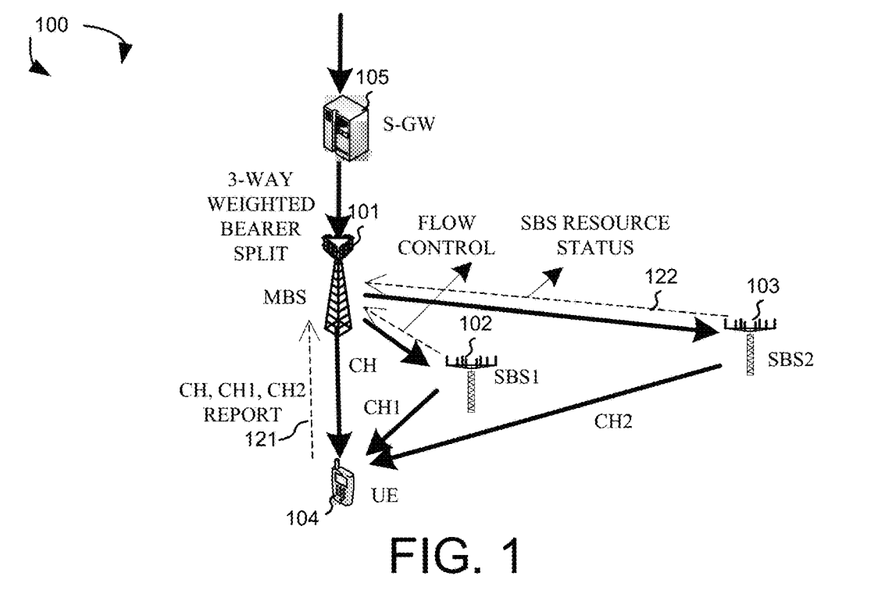
FIG. 1 illustrates a macro-assisted multi-connectivity scheme in a heterogeneous network (HetNet) having a macrocell and overlapping Millimeter Wave (mmWave) smallcells in accordance with one novel aspect.

FIG. 1 illustrates a macro-assisted multi-connectivity scheme in a heterogeneous network (HetNet) 100 having a microwave macrocell and overlapping Millimeter Wave (mmWave) smallcells in accordance with one novel aspect. HetNet 100 comprises a macro base station MBS 101, a first smallcell base station SBS1 102, a second smallcell base station SBS2 103, a user equipment UE 104, and a serving gateway SGW 105. FIG. 1 illustrates a multi-connectivity (MC) mobility scheme for macro-assisted low to medium UE mobility across a cluster of mmWave smallcells under the same macrocell coverage.

In accordance with a first novel aspect, macro-assisted and UE intelligent HetNet mobility is provided. A novel end-to-end Multi-Connectivity (MC) scheme for U-Plane make-before-break mobility or multi-cell bandwidth (BW) aggregation for the purpose of edgeless uniform UE performance and seamless mobility services. This BW aggregation is at PDCP layer bundling multiple SBS's U-plane resources with MBS's U-plane resource for the same UE under their coverage. In accordance with a second novel aspect, a dynamic weight-based U-plane configuration of 2-way, 3-way, or multi-way split bearer is provided. A novel definition of split bearer and a novel control flow to set up or tear down sub-bearer, adapt the load split onto each sub-bearer in weighted manner based on any existing scheduling algorithm and one or all of the following (non-limiting) weighting factors: 1) the real-time channel quality of its radio link; 2) SBS's available resources (buffer status, X2 link quality) and other flow control variables of each sub-bearer; 3) UE mobility states; and 4) smallcell addition or release status (based on independent target SBS selection schemes).

In one example, MBS 101 adopts a 3-way or multi-way PDCP bearer split with SBS1 102 and SBS2 103 based on scheduling and routing weighted by the list of weighting factors with or without inter-BS flow control. UE 104 establishes multiple connections with MBS 101, SBS1 102, and SBS2 103 (e.g., CH, CH1, and CH2, respectively). Optionally, the UE provides channel quality of its radio links to the MBS as depicted by arrow 121, while the SBSs provide their resource status to the MBS as depicted by arrow 122 to enable the MBS making dynamic scheduling and routing decisions. In the downlink (DL), PDCP layer traffic flows through SGW 105 to MBS 101, and is then scheduled by the MBS to flow to the UE directly, or through SBS1 102 and/or SBS2 103 and then to the UE. In the uplink (UL), PDCP layer traffic is routed by MBS 101 from the UE to the MBS and the SGW directly, or through SBS1 and/or SBS2 and then to the MBS and the SGW.

Figure 2:
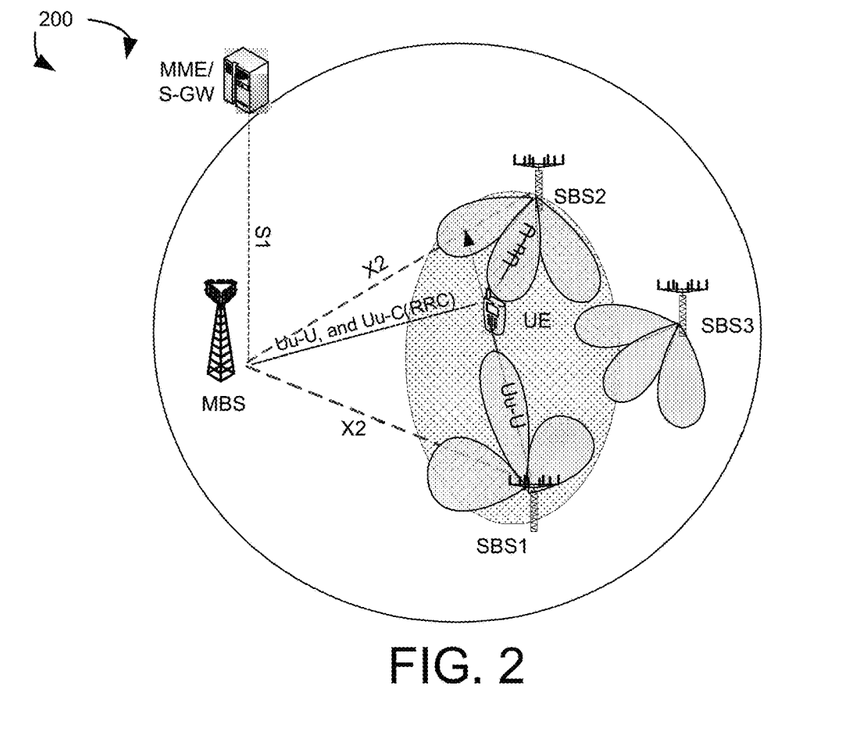
FIG. 2 illustrates a macro-assisted make-before-break multi-connectivity (MC) mobility utilizing MC split bearer user plane in accordance with one novel aspect.

FIG. 2 illustrates a macro-assisted make-before-break multi-connectivity (MC) mobility utilizing MC split bearer user plane in HetNet 200 in accordance with one novel aspect. HetNet 200 comprises a mobility management entity MME, a serving gateway SGW, a macrocell base station MBS, three smallcell base stations SBS1, SBS2, and SBS3, and a user equipment UE. In the example of FIG. 2, the UE is connected to multiple base stations in data plane (MBS, SBS1, and SBS2 via Uu-U) through a single multi-way PDCP bearer simultaneously, but is anchored or connected to the MBS only in RRC control plane (via Uu-C(RRC)). The UE monitors and reports dynamic channel states to the MBS for network-side routing or scheduling decision of loading traffic onto different sub-bearers of the multi-way split bearer. Given the RRM information between UE-SBS(s), the MBS can follow process to handle SBS addition, release, modification and change to achieve macro-assisted mobility with MC when UE moves across a cluster of smallcells under the same macrocell coverage.

Figure 3:
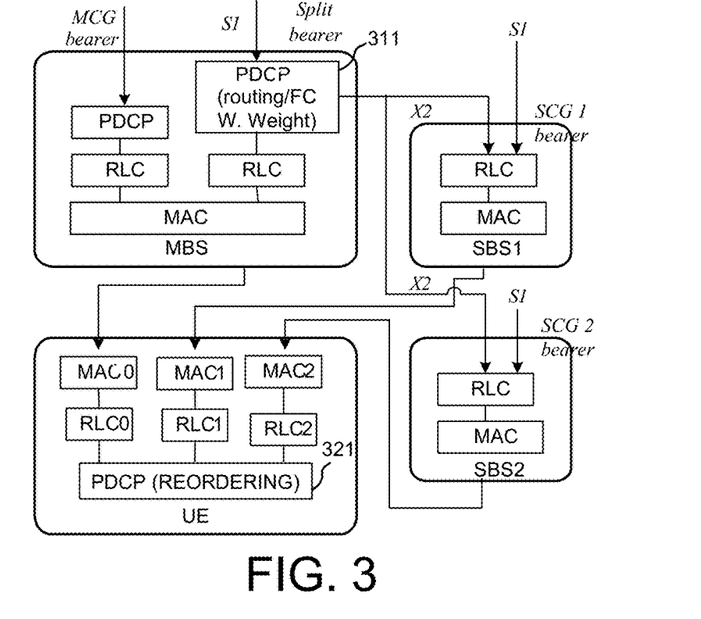
FIG. 3 is a simplified block diagrams of macrocell base station (MBS), smallcell base stations (SBS), and a user equipment (UE) that carry certain embodiments of the present invention.

FIG. 3 is a simplified block diagrams of macrocell base station (MBS), two smallcell base stations (SBS1 and SBS2), and a user equipment (UE) that carry certain embodiments of the present invention. In the example of FIG. 3, the MBS comprises MAC, RLC, and PDCP protocol layers and a PDCP handler 311 for routing/flow control with weighting. SBS1 and SBS2 each comprises MAC and RLC protocol layer entities. The UE comprises multiple entities for MAC and RLC protocol layers and a PDCP handler 321 for PDCP packets reordering. The multi-connectivity 3-way split bearer includes one MCG sub-bearer, one SCG1 sub-bearer, and one SCG2 sub-bearer in the U-plane. Through PDCP handler 311, the MBS collects dynamic channel states for making a routing or a scheduling decision of loading traffic onto different sub-bearers of the 3-way split bearer. The UE adopts the dynamic weighted based U-plane routing and scheduling for the 3-way split bearer. In the downlink, the UE reorders PDCP layer packets via PDCP hander 321 for a single downlink flow that arrives at the UE from one or more base stations (MBS, SBS1, and SBS2). In the uplink, the UE splits PDCP layer packets for a single uplink flow that is destined to the MBS directly or through SB1 and/or SBS2.

Figure 4:
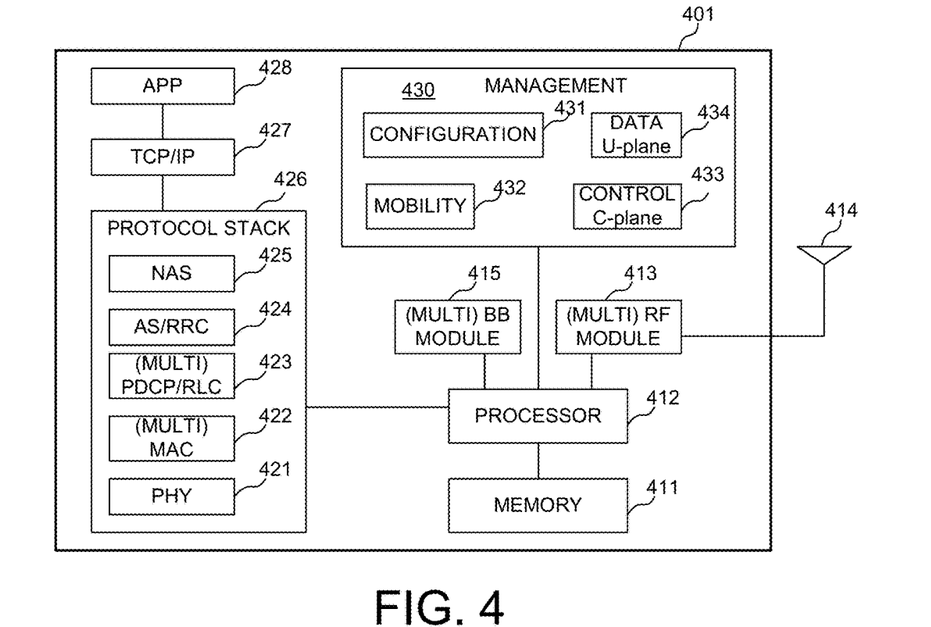
FIG. 4 is a simplified block diagram of a user equipment (UE) that carry certain embodiments of the present invention.

FIG. 4 is a simplified block diagram of a user equipment (UE 401) that carry certain embodiments of the present invention. UE 401 has an antenna (or antenna array) 414, which transmits and receives radio signals. A RF transceiver module (or multi-RF modules) 413, coupled with the antenna, receives RF signals from antenna 414, converts them to baseband signals and sends them to processor 412 via baseband module (or dual BB modules) 415. RF transceiver 413 also converts received baseband signals from processor 412 via baseband module 415, converts them to RF signals, and sends out to antenna 414. Processor 412 processes the received baseband signals and invokes different functional modules to perform features in UE 401. Memory 411 stores program instructions and data to control the operations of UE 401.

UE 401 also includes a 3GPP protocol stack module 426 supporting various protocol layers including NAS 425, AS/RRC 424, (multi-)PDCP/RLC 423, (multi-)MAC 422 and PHY 421, a TCP/IP protocol stack module 427, an application module APP 428, and a management module 430 including a configuration module 431, a mobility module 432, a control module 433, and a data handling module 434. The function modules, when executed by processor 412 (via program instructions and data contained in memory 411), interwork with each other to allow UE 401 to perform certain embodiments of the present invention accordingly. Configuration module 431 obtains U-plane setup preference information, mobility circuit 432 determines UE mobility, control circuit (C-Plane handler) 433 determines and applies a preferred U-plane setup for the UE dynamically, and data-handling circuit (U-Plane handler) 434 performs corresponding U-path setup activation, selection, and packet data transferring.

Figure 5:
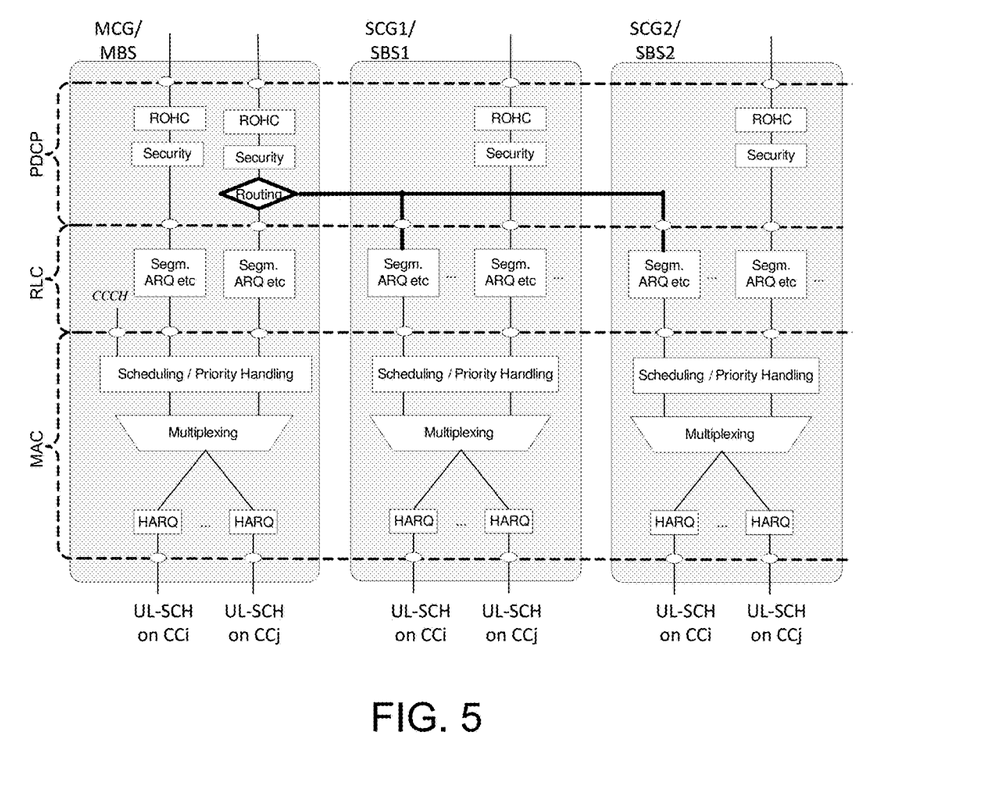
FIG. 5 illustrates a weighted multi-connectivity (MC) split bearer from protocol layers in different base stations (MBS and SBS) with an embodiment of a 3-way UL split bearer.

FIG. 5 illustrates a weighted multi-connectivity (MC) split bearer from protocol layers in different base stations (MBS and SBS1 and SBS2) with an embodiment of a 3-way UL split bearer. Each base station comprises PDCP, RLC and MAC sublayers. The MBS considers UE's RRM measurement reports to decide whether or when to set up MC mobility with 3-way PDCP sublayer PDU TX routing and RX reordering. The UE learns the smallcell SBS and bearer addition, release, change, modification still with its control plane anchored only at the MBS. The MBS adapts the load or routes traffic onto the split bearer based on real-time feedback of radio quality (for each channel) with each involved SBS, using weighted fair queueing for example, until it realizes that it may have to change the bearer from 2-way to 3-way or vice versa.

Figure 6:
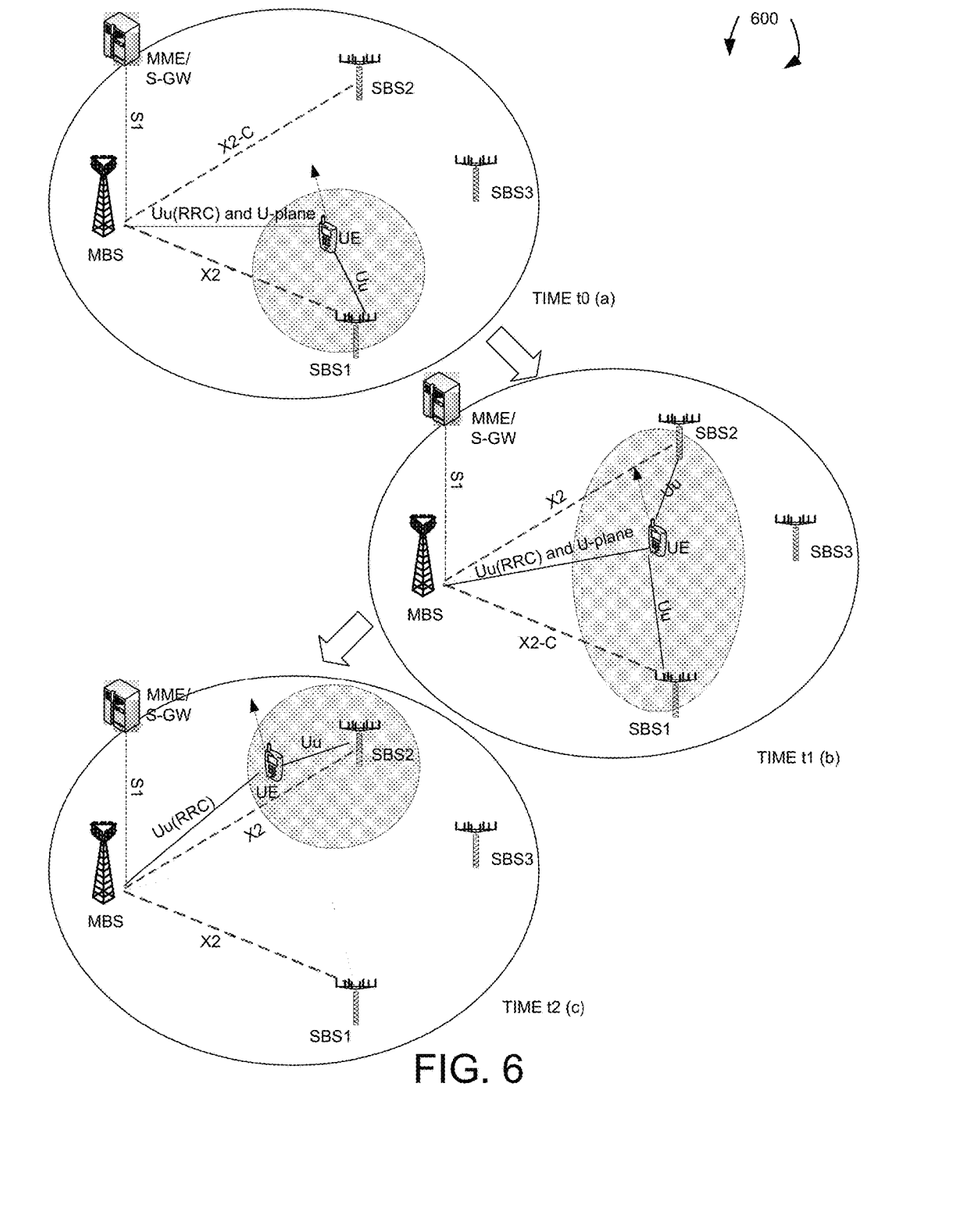
FIG. 6 illustrates one embodiment of a macro-assisted make-before-break mobility process with multi-connectivity (MC) by using multi-way split bearer.

FIG. 6 illustrates one embodiment of a macro-assisted make-before-break mobility process with multi-connectivity (MC) by using multi-way split bearer in a HetNet 600. HetNet 600 comprises a mobility management entity MME, a serving gateway SGW, a macrocell base station MBS, three smallcell base stations SBS1, SBS2, and SBS3, and a user equipment UE. The UE moves across the mmWave smallcells under the same macrocell coverage. Initially, the UE establishes a radio resource control (RRC) connection with the MBS for C-plane. The UE is located near SBS1 and establishes a multi-connectivity (MC) 2-way split bearer U-plane for simultaneous data transmission with both MBS and SBS1.

At time t0 as depicted in (a), UE moves away from SBS1 towards SBS2. MBS learns it from the control plane connection signaling, e.g., RRM reports from the UE. MBS predicts that SBS2 (not SBS3) to be potential target. At time t1 as depicted in (b), MBS helps to establish UE-SBS2 data connection while possibly maintaining UE-SBS1 connection by adopting the weighted (3-way or N-way) multi-connectivity bearer split, with shares of traffic routed towards each SBS in proportion to their weighting factors. For example, by following any channel-independent scheduling, e.g., weighted fair queueing or proportional fairness scheduling. In the meanwhile, MBS decides to request resources from the SBS1 or SBS2 of certain amount, so that the QoS for the respective E-RAN is guaranteed by the exact sum of resources provided by the MBS and the SBS(s) together, or even more. At time t2 as depicted in (c), when UE moves further away from SBS1, based on channel reports, MBS disconnects UE-SBS1 connection, and directs all data to UE-SBS2 connection, i.e., changing the 3-way split bearer to 2-way split bearer.

In legacy LTE mobility or LTE DuCo, break-before-make mobility scheme is a common practice, with which a UE initially connected to a single (small cell) base station breaks the existing connection before it can make or connect to another neighboring small cell. In other words, the UE will not communicate with two small cell base stations particularly in user plane simultaneously. By "make-before-break", the proposed MC scheme is making/setting up the connection with another neighboring SBS without breaking/disconnecting with the existing one, all under the umbrella of the MBS coverage and with the signaling and control support of MBS. In the embodiment of macro-assisted small cell mobility, the proposed multi-connectivity (MC) mobility enables one UE to connect and communicate with two or more small cell base stations simultaneously, as elaborated by the control-plane end-to-end signaling support for SBS addition/release/modification, UE-MBS channel measurement and inter-BS exchange for flow control, and user-plane PDCP-layer multi-way split bearer supported by BS's and UE. By allowing a UE connecting to two or more SBSs at the same time, the MC scheme enables BW aggregation at the cell edge and more seamless handover between SBSs.

Figure 7:
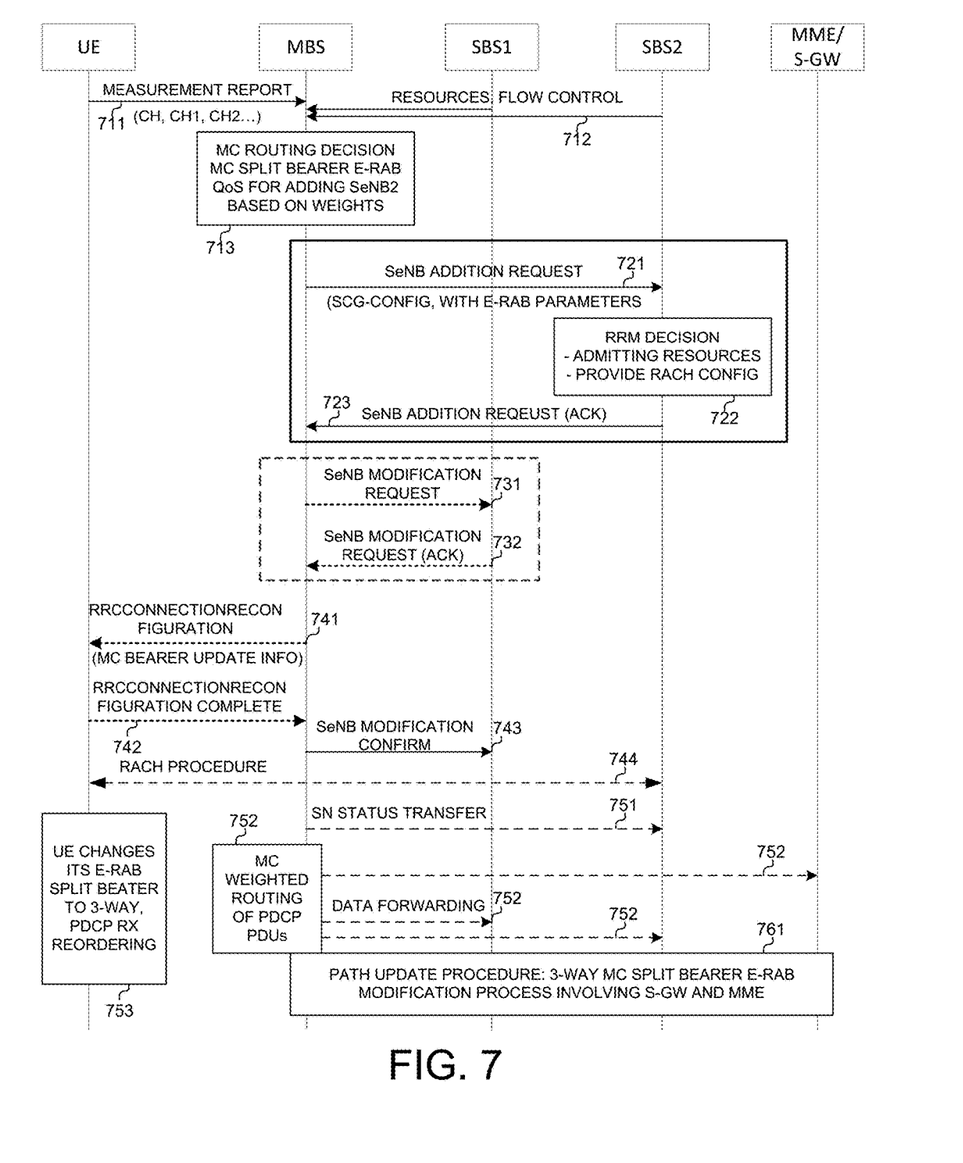
FIG. 7 illustrates a first example of a message flow for multi-connectivity SBS addition by an embodiment of forming 3-way simultaneous connectivity with one MeNB and two SeNB's.

FIG. 7 illustrates a first example of a message flow for multi-connectivity SBS addition by an embodiment of forming 3-way simultaneous connectivity with one MeNB and two SeNB's. The example of FIG. 7 corresponds to the example of FIG. 6 when UE moves from time t0 to time t1. The UE is connected to MBS and SBS1, and is moving toward SBS2. As a result, SBS2 can be added by a 3-way split bearer at MBS (with SBS1 and SBS2), with modifications to MBS, SBS1, and SBS2. In step 711, UE sends a measurement report of radio link quality to MBS. In step 712, SBS1 and SBS2 sends their available resources and other flow control variables to MBS. In step 713, MBS makes MC rounding decision: to calculate MC split bearer E-RAB QoS parameters for SBS1 and to-be-added SBS2 based on weights (RRM, resource, etc.). In step 721, MBS sends an SBS addition request to SBS2, carrying SCG configuration information, with the E-RAB parameters for the 3-way MC split bearer. In step 722, SBS2 makes RRM decision: admitting resources for the MC split bearer and allocating L1 and L2, and providing dedicated RACH configuration for synchronization. In step 723, SBS2 sends an SBS addition request acknowledge back to MBS, carrying SCG configuration. In step 731, MBS sends an SBS modification request to SBS1, with MC split bearer E-RAB QoS. In step 732, SBS1 replies with an SBS modification request acknowledgement. In step 741, UE receives a RRC connection reconfiguration from MBS, carrying MC bearer update information. In step 742, UE sends a RRC connection reconfiguration complete to MBS. In step 743, MBS sends an SBS modification confirm to SBS1. In step 744, UE performs random access procedure with SBS2 for synchronization. In step 751, MBS sends serial number status transfer to SBS2. In step 752, MBS makes MC weighted routing decision for PDCP PDUs and forwards data to SGW, SBS1, and SBS2. In step 753, UE changes its E-RAB split bearer to 3-way, and continue PDCP RX reordering. Finally, in step 761, MBS performs path update procedure: 3-way MC split bearer E-RAB modification process, involving both SGW and MME.

Figure 8:
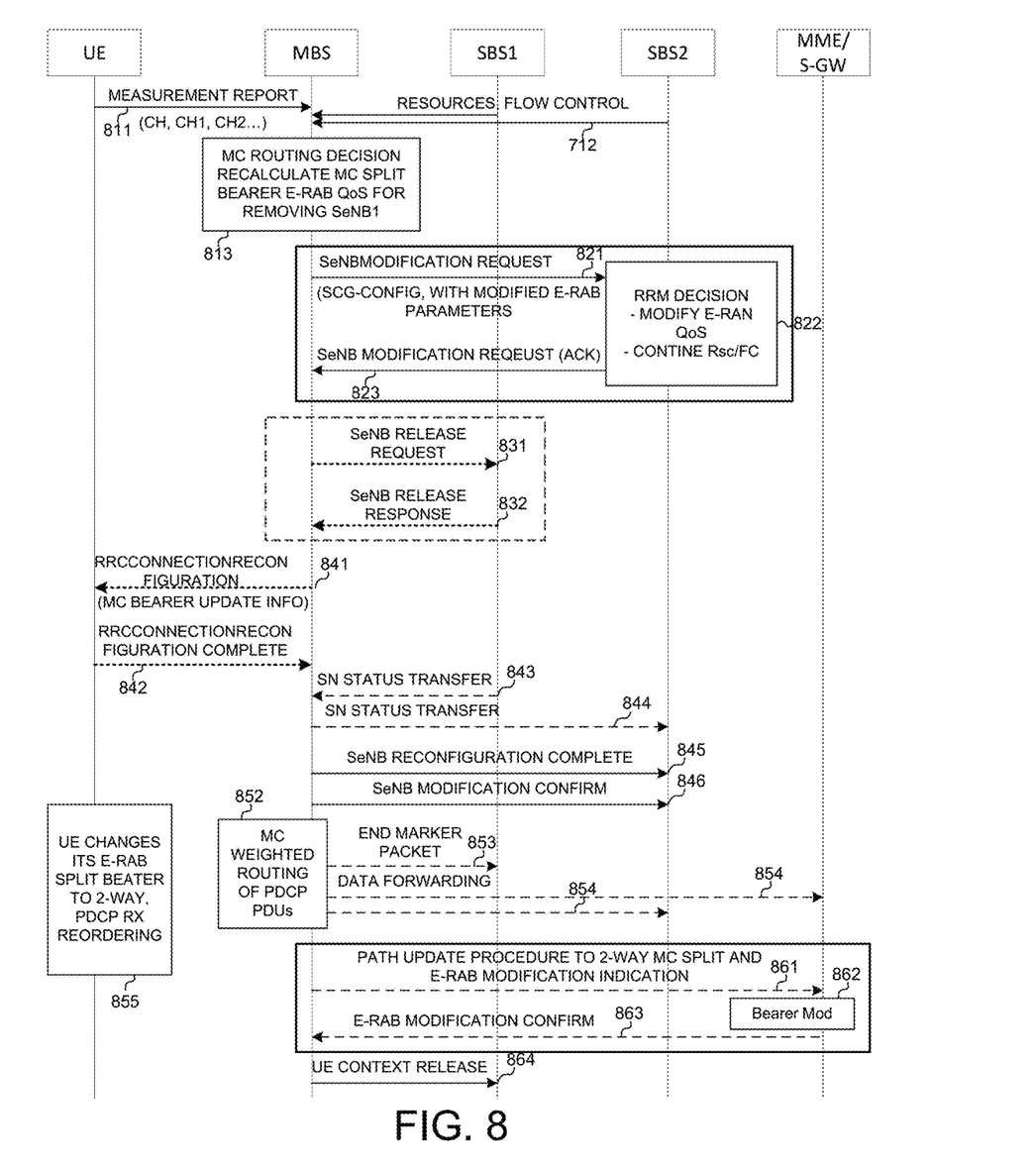
FIG. 8 illustrates a second example of a message flow for multi-connectivity SBS modification or release by an embodiment of switching from 3-way split bearer to 2-way split bearer.

FIG. 8 illustrates a second example of a message flow for multi-connectivity SBS modification or release by an embodiment of switching from 3-way to 2-way split bearer. The example of FIG. 8 corresponds to the example of FIG. 6 when UE moves from time t1 to time t2. When UE is moving further away from SBS1, the 3-way MC split bearer (between MBS, SBS1, and SBS2) is converted to a 2-way MS split bearer (between MBS and SBS2) by releasing SBS1 and modifying E-RAB bearer for UE, MBS, and SBS2. In step 811, UE sends a measurement report of radio link quality to MBS. In step 812, SBS1 and SBS2 sends their available resources and other flow control variables to MBS. In step 813, MBS makes MC rounding decision: to re-calculate MC split bearer E-RAB QoS parameters for removing SBS1, and change 3-way to 2-way MC split bearer. In step 821, MBS sends a SeNB modification request to SBS2, with modified MC split bearer E-RAB QoS. In step 822, SBS2 makes RRM decision: modify its E-RAB QoS for the split bearer and continue resource and flow control update with MBS. In step 823, SBS2 sends a SeNB modification request acknowledge back to MBS. In step 831, MBS sends an SBS release request to SBS1. In step 832, SBS1 replies with an SBS release response. In step 841, UE receives a RRC connection reconfiguration from MBS, carrying MC bearer update information. In step 842, UE sends a RRC connection reconfiguration complete to MBS. In step 843, SBS1 sends SN status transfer to MBS. In step 844, MBS sends SN status transfer to SBS2. In step 845, MBS sends SeNB reconfiguration complete to SBS2. In step 846, MBS sends SeNB modification confirm to SBS2. In step 852, MBS makes MC weighted routing decision for PDCP PDUs. In step 853, MBS sends end marker packet to SBS1. In step 854, MBS forwards data to SGW and SBS2. In step 855, UE changes its E-RAB split bearer to 2-way, and continue PDCP RX reordering. Finally, in step 861, MBS performs path update procedure: 3-way MC split bearer E-RAB modification to become 2-way MC split bearer, involving SGW and MME, and send E-RAB modification indication. In step 862, bearer modification is performed between SGW and MME. In step 863, MBS receives E-RAB modification confirmation. In step 864, MBS sends UE context release to SBS1.

There are multiple possible variants to the present invention of macro-assisted MC mobility scheme. It applies to one LTE or evolved LTE macro-BS plus multiple mmWave small cells or any other small cell RATS, e.g., any 3GPP RAT technologies. The MC scheme can be extended to similar 3GPP schemes such as eLWA or LWA (LTE/WLAN aggregation), where Wi-Fi AP or Wi-Fi termination (WT) is acting like a smallcell, while macrocell is LTE eNB, with PDCP-layer DuCo like 2-way LWA split bearer, switched LWA bearer, or LWA bearer corresponding to DuCo split bearer. The exemplary changes between 2-way and 3-way bearer split (or split bearer) can be extended to N-way, where integer N can be larger than 3, by following the same mechanism. The MC scheme can be extended to other layers of 3-way or N-way multi-connectivity for one MBS and multiple SBSs talking to the same UE at the same time, as long as the weighted flow splitting and make-before-break mobility scheme are followed similarly. It applies to non-mobility MC scheme as well. The messaging and control flow in MC SBS addition/modification/release plots may be revised with shuffled steps, more or less information elements, etc., but still follow the same logic as defined. The messaging and control flow in MC SBS addition/modification/release plots may be extended similarly to other scenarios, including MBS-to-MBS handover with each MBS has two or more serving SBS's for the same UE in its coverage. Duplicate or different PDUs from the same flow but through multiple data paths (by different SBSs). Dynamic weight based routing or 2-way, or multi-way (N-way) MC split bearer configuration of its E-RAB QoS parameters can split same-flow PDCP traffic onto each sub-bearer (that corresponds to different SBS for the same split bearer). While the routing can be based on any existing scheduling algorithms and one or all of the following (non-limiting) weighting factors: 1) the real-time channel quality of UE-sensed radio link, e.g, RSRP, RSRP, etc., from each MBS or SBS; 2) SBS's available resources (buffer), X2 or radio link quality, or other Flow Control variables for each sub-bearer; and 3) UE mobility states; small cell addition/release status (based on independent target SBS selection schemes).

Figure 9:
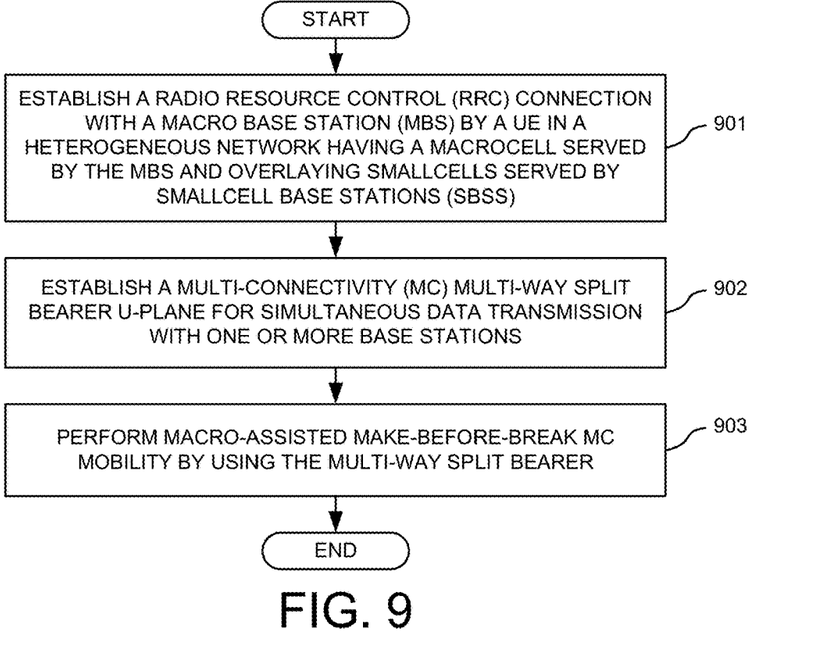
FIG. 9 is a flow chart of a macro-assisted multi-connectivity scheme from UE perspective in multi-RAT cellular systems in accordance with one novel aspect.

FIG. 9 is a flow chart of a macro-assisted multi-connectivity scheme from UE perspective in multi-RAT cellular systems in accordance with one novel aspect. In step 901, a UE establishes a radio resource control (RRC) connection with a macro base station (MBS) in a Heterogeneous network having a macrocell served by the MBS and overlaying smallcells service by smallcell base stations (SBSs). In step 902, the UE establishes a multi-connectivity (MC) multi-way split bearer U-Plane for simultaneous data transmission with one or more base stations. In step 903, the UE performs macro-assisted make-before-break MC mobility by using the multi-way split bearer.

Figure 10:
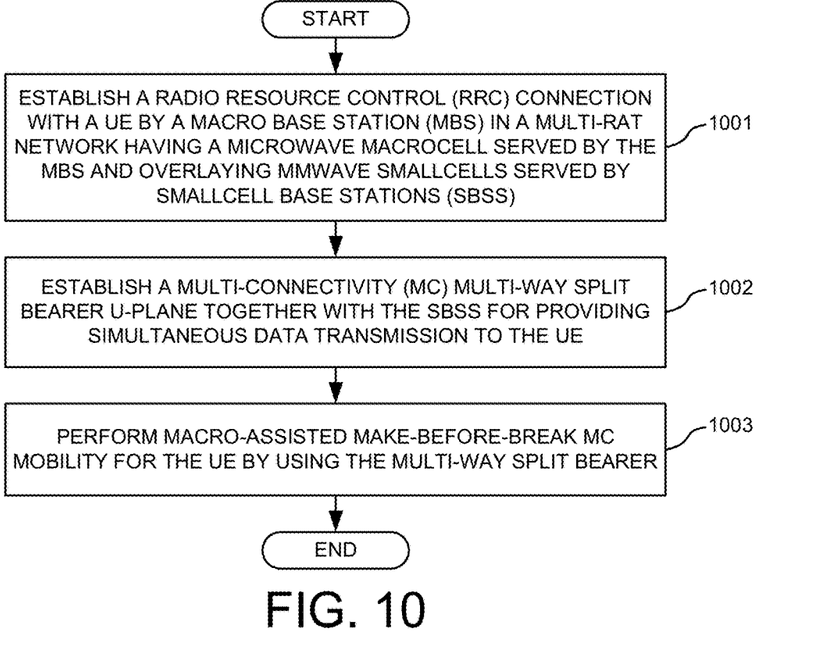
FIG. 10 is a flow chart of a macro-assisted multi-connectivity scheme from network perspective in multi-RAT cellular systems in accordance with one novel aspect.

FIG. 10 is a flow chart of a macro-assisted multi-connectivity scheme from network perspective in multi-RAT cellular systems in accordance with one novel aspect. In step 1001, a macro base station (MBS) establishes a radio resource control (RRC) connection with a UE in a multi-RAT network having a microwave macrocell served by the MBS and overlaying mmWave smallcells served by smallcell base stations (SBSs). In step 1002, the MBS establishes a multi-connectivity (MC) multi-way split bearer U-Plane together with the SBSs for providing simultaneous data transmission to the UE. In step 1003, the MBS performs macro-assisted make-before-break MC mobility for the UE by using the multi-way split bearer.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   establishing a radio resource control (RRC) connection with a macro base station (MBS) by a user equipment (UE) in a heterogeneous network having a macrocell served by the MBS and overlaying smallcells served by smallcell base stations (SBSs);
   establishing a multi-connectivity (MC) multi-way split bearer U-plane for simultaneous data transmission with one or more base stations; and
   performing macro-assisted make-before-break MC mobility by using the multi-way split bearer, wherein the make-before-break MC mobility involves switching between (N−1)-way and N-way of the multi-way split bearer, wherein N is an integer that is greater than one.

2. The method of claim 1, wherein UE monitors and reports dynamic channel states to the MBS for a routing or a scheduling decision of loading traffic onto different sub-bearers of the multi-way split bearer.

3. The method of claim 1, wherein the UE reorders Packet Data Convergence Protocol (PDCP) layer packets for a single downlink flow that arrives at the UE from one or more base stations.

4. The method of claim 1, wherein the UE splits PDCP layer packets for a single uplink flow that is destined to the MBS through one or more base stations.

5. The method of claim 1, wherein the UE adopts a dynamic weighted based U-plane routing and scheduling for the multi-way split bearer.

6. The method of claim 1, wherein the multi-way split bearer switching is based on channel quality, resource availability, network policy, UE preference, and traffic loads.

7. The method of claim 1, wherein the UE uses the multi-way split bearer to aggregate multi-cell bandwidth at PDCP layer for packets from one flow but through different base stations.

8. A User Equipment (UE) comprising:
   a radio frequency (RF) transceiver that transmits and receives RF signals;
   a control plane circuit that establishes a radio resource control (RRC) connection with a macro base station (MBS) using the RF transceiver in a heterogeneous network having a macrocell served by the MBS and overlaying smallcells served by smallcell base stations (SBSs);
   a user plane circuit that establishes a multi-connectivity (MC) multi-way split bearer U-plane for simultaneous data transmission with one or more base stations; and
   a mobility circuit that performs macro-assisted make-before-break MC mobility by using the multi-way split bearer, wherein the make-before-break MC mobility involves switching between (N−1)-way and N-way of the multi-way split bearer, wherein N is an integer that is greater than one.

9. The UE of claim 8, wherein UE monitors and reports dynamic channel states to the MBS for a routing or a scheduling decision of loading traffic onto different sub-bearers of the multi-way split bearer.

10. The UE of claim 8, wherein the UE reorders Packet Data Convergence Protocol (PDCP) layer packets for a single downlink flow that arrives at the UE from one or more base stations.

11. The UE of claim 8, wherein the UE splits PDCP layer packets for a single uplink flow that is destined to the MBS through one or more base stations.

12. The UE of claim 8, wherein the UE adopts a dynamic weighted based U-plane routing and scheduling for the multi-way split bearer.

13. The UE of claim 8, wherein the multi-way split bearer switching is based on channel quality, resource availability, network policy, UE preference, and traffic loads.

14. The UE of claim 8, wherein the UE uses the multi-way split bearer to aggregate multi-cell bandwidth at PDCP layer for packets from one flow but through different base stations.

15. A method comprising:
   establishing a radio resource control (RRC) connection with a user equipment (UE) by a macro base station (MBS) in a multi-Radio Access Technology (RAT) network having a microwave macrocell served by the MBS and overlaying smallcells served by smallcell base stations (SBSs);
   establishing a multi-connectivity (MC) multi-way split bearer U-plane together with the SBSs for providing simultaneous data transmission to the UE; and
   performing macro-assisted make-before-break MC mobility for the UE by using the multi-way split bearer, wherein the MBS supports SBS addition or removal from the multi-way split bearer through a Radio Access Network (RAN) and a core network signaling to enable the multi-way bearer splitting or merging.

16. The method of claim 15, wherein the MBS collects dynamic channel states for making a routing or a scheduling decision of loading traffic onto different sub-bearers of the multi-way split bearer.

17. The method of claim 15, wherein the MBS exchanges signaling carrying weighting information with the SBSs and the UE for a weighted traffic splitting/merging at the packet data convergence protocol (PDCP) layer.

18. The method of claim 17, wherein the PDCP layer packets routing/merging occurs for a single uplink flow that is destined to the MBS through one or more base stations.

19. The method of claim 17, wherein the PDCP layer packets scheduling/splitting occurs for a single downlink flow that arrives at the UE through one or more base stations.

20. The method of claim 15, wherein the make-before-break MC mobility involves switching between (N−1)-way and N-way of the multi-way split bearer, wherein N is an integer that is greater than one.

21. The method of claim 20, wherein the multi-way split bearer switching is based on channel quality, resource availability, network policy, UE preference, and traffic loads.

* * * * *